United States Patent [19]

Muchel

[11] Patent Number: 4,525,042
[45] Date of Patent: Jun. 25, 1985

[54] OPTICAL SYSTEM OF VARIABLE FOCAL AND BACK-FOCAL LENGTH

[75] Inventor: Franz Muchel, Königsbronn, Fed. Rep. of Germany

[73] Assignee: Carl-Zeiss-Stiftung, Heidenheim on the Brenz, Fed. Rep. of Germany

[21] Appl. No.: 455,666

[22] Filed: Jan. 5, 1983

[30] Foreign Application Priority Data

Jan. 23, 1982 [DE] Fed. Rep. of Germany ....... 3202075

[51] Int. Cl.³ ............................................. G02B 15/16
[52] U.S. Cl. .................................... 350/519; 350/520
[58] Field of Search ................ 350/423, 511, 518–520, 350/560, 570, 572

[56] References Cited

U.S. PATENT DOCUMENTS 3,045,545  7/1962  Korones et al. ..................... 350/560
3,456,998  7/1969  Rosenberger et al. .............. 350/519

FOREIGN PATENT DOCUMENTS 238961  3/1965  Austria ................................ 350/519
239569  4/1965  Austria ................................ 350/519

Primary Examiner—William H. Punter
Attorney, Agent, or Firm—Stonebraker, Shepard & Stephens

[57] ABSTRACT

In an optical system of variable focal and back-focal length for operation microscopes, an objective of fixed focal length is combined with an optical system of variable focal length consisting of two lens groups, the first lens group of which is displaceable. The objective projects a real, virtual, or infinity image of the object and the displaceably arranged lens group of the optical system of variable focal length images the image projected by the objective into the focal point of the second lens group of the system. The second lens group consists of two parts which are displaceable in the direction of their optical axis in order to adjust the focal length of the microscope.

5 Claims, 4 Drawing Figures

OPTICAL SYSTEM OF VARIABLE FOCAL AND BACK-FOCAL LENGTH

BACKGROUND OF THE INVENTION

The present invention relates to an optical system of variable focal and back-focal length. It is intended primarily for use in operation microscopes, but it can also be used in other optical systems, for instance in stereo microscopes in industry (technical microscopes), or in monocular viewing instruments.

In the use of stereo microscopes in medicine and in industry, it is necessary to be able to adapt the working distance to different heights of the object without changing the position of the heavy microscope body, and to be able to change the focal length of the stereo microscope with a fixed working distance.

From West German Offenlegungsschrift (published patent application) No. 24 39 820 published on Mar. 4, 1976, it is known, for instance, to provide an operation microscope with a focusable main objective in order to adapt the working distance to different heights of object without changing the position of the microscope body. This known solution has the disadvantage that it requires a large structural height of the microscope body. For a large range of back-focuses a large path of displacement of the objective is also necessary. A change in the focal length with fixed working distance is not possible in this known operation microscope.

The object of the present invention, therefore, is to provide an optical system which can satisfy effectively both the need of adapting the working distance to different heights of object and of changing the focal length with a fixed working distance.

SUMMARY OF THE INVENTION

This object is achieved in accordance with the invention by means of an optical system which is characterized by the fact that an objective of fixed focal length is combined with an optical system of variable focal length consisting of two lens groups, the objective projecting a real, virtual, or infinity image of the object. Also, the first lens group of the system is displaceable and images the image projected by the objective into the focal point of the second lens group of the system.

The second lens group can have a variable focal length in the manner of a zoom lens, in order to change the focal length of the whole optical system.

The advantages obtained by the invention reside in particular in the fact that it makes possible a compact construction of an operation microscope. Due to the small lens diameter, the optical system of the invention can be corrected more easily than is known from the prior art.

One illustrative embodiment of the invention is shown in the drawing and will be described in further detail below.

BRIEF DESCRIPTION OF THE DRAWINGS

FIG. 1a is a graphic showing of certain numerical values of the entrance and exit pupils with different magnification scales;

DESCRIPTION OF THE PREFERRED EMBODIMENT

Figure 1:
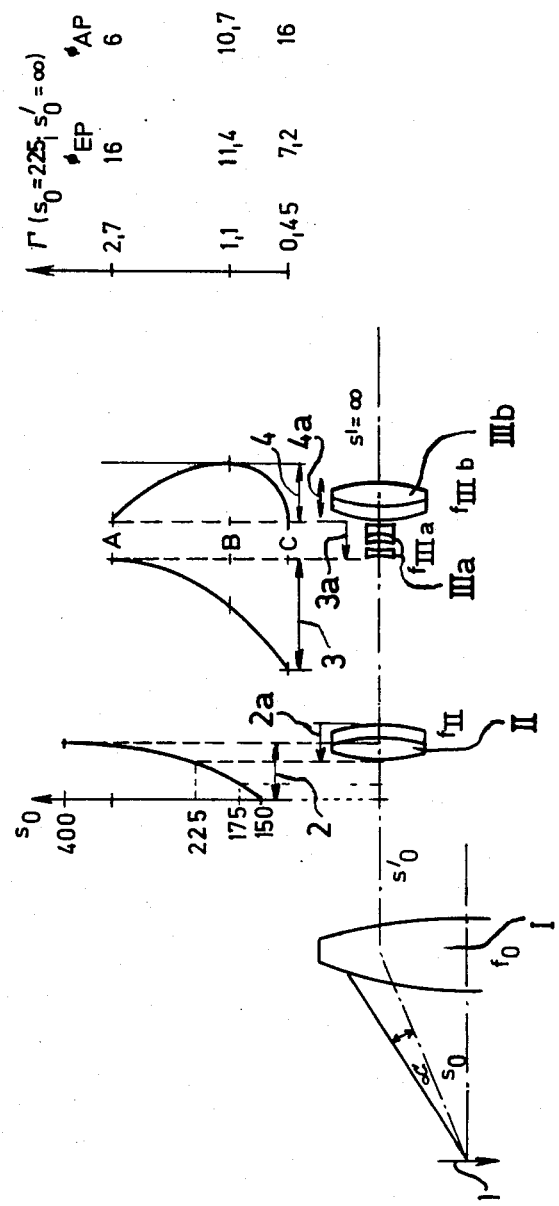
FIG. 1 is a diagrammatic showing of the optical system in the ray path of an operation microscope leading to an eyepiece.

Referring to FIG. 1, there is shown schematically the lens system of an operation microscope, leading to a conventional eyepiece (not shown). The system comprises three lens groups respectively designated as groups I, II, and III, with group III subdivided into two subgroups IIIa and IIIb. In accordance with acceptable optical terminology, the word "group" is not meant to imply that the group must have two or more component lens elements, since in some cases a "group" may consist of only a single component.

Group I is the main objective of the operation microscope. It has the focal length $f_o = 225$ mm. The numerical aperture of the operation microscope is designated $\alpha$, the entrance back-focal length $s_o$ and the field of view by the arrow 1. The entrance back-focal length $s_o$ is at the same time the working distance of the operation microscope. If there is chosen $s_o = f_o$, the main objective I produces an infinity image of the object, i.e. the back-focal length $s_o'$ is $\infty$.

The distance 2 designates the range within which the lens group II is displaceable in direction 2a. The curve and scale entered above the lens group II illustrate graphically the dependence of the entrance back-focal length $s_o$ on the position of the lens group II with respect to the main objective I. For the respective entrance back-focal lengths $s_o$ of 150, 175, 225, and 400, the respective positions of the lens group II with respect to objective I are indicated by perpendicular lines dropped onto the optical axis. In the position shown in FIG. 1, the lens group II is in the position which permits an entrance back-focal length and thus a working distance of 225 mm. In its position located closest to the main or principal objective I, the operation microscope has a working distance of 150 mm. The focal length $f_{II}$ of the lens group II is 50.6 mm.

When moving lens group II in the direction of arrow 2a shown in FIG. 1, it is necessary to move this lens group also in a direction perpendicular to the optical axis as will be declared later on.

The curves and scale shown above the lens group IIIa, IIIb, show the magnification scales $\Gamma = 0.45$, $\Gamma = 1.1$, and $\Gamma = 2.7$ which result when the lens group IIIa is moved in the direction of the arrow 3a within the range 3 and the lens group IIIb is moved in the direction of the double-ended arrow 4a within the range 4. In order to pass through the three marked magnification scale points A, B and C, the lens group IIIb must therefore be moved from the position for the magnification A shown in FIG. 1 first of all away from the principal objective I and then back toward the principal objective I, while the lens group IIIa is moved only in one direction in order to pass through the magnification scales from A to C.

In the diagram of FIG. 1a, the magnification scales $\Gamma = 2.7$, 1.1 and 0.45 are entered for the points A, B and C of the function curves, as well as the entrance pupils $\phi_{EP}$ and exit pupils $\phi_{AP}$ of the operation microscope. The working distance $s_o$ is here 225 mm, so that $s_o'$ is $\infty$.

Figure 2:
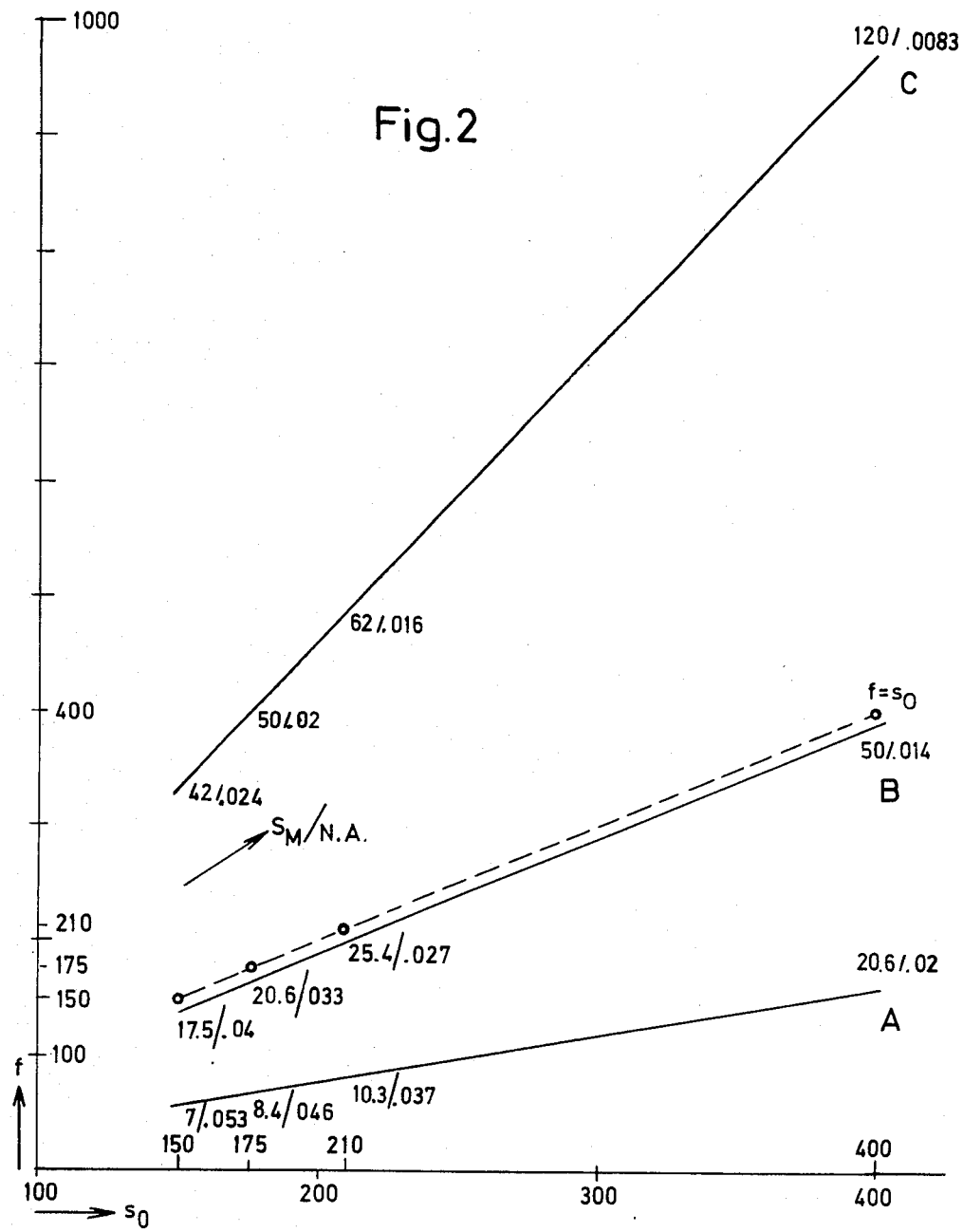
FIG. 2 is a graph plotting the focal length f of the optical system as a function of the entrance back-focal length $s_o$.

In the graph of FIG. 2, the focal length graduations f of the operation microscope from 57 mm. to 1000 mm.

are entered for the magnifications corresponding to points A, B and C for working distance $s_o$ of 150 mm. to 400 mm. The numerical values entered alongside the curves indicate the ratio of the field of view $S_M$ to the numerical aperture N.A.

FIG. 2 shows that it is possible to change the focal length of the whole optical system between 57 and 1000 mm independently from the working distance which is adjustable by moving lens group II with respect to the main objective I. On the other hand FIG. 2 shows that is also possible to adjust the working distance $s_o$ between 150 and 400 mm by moving lens groups II and III for an elected focal length f of the operation microscope.

Figure 3:
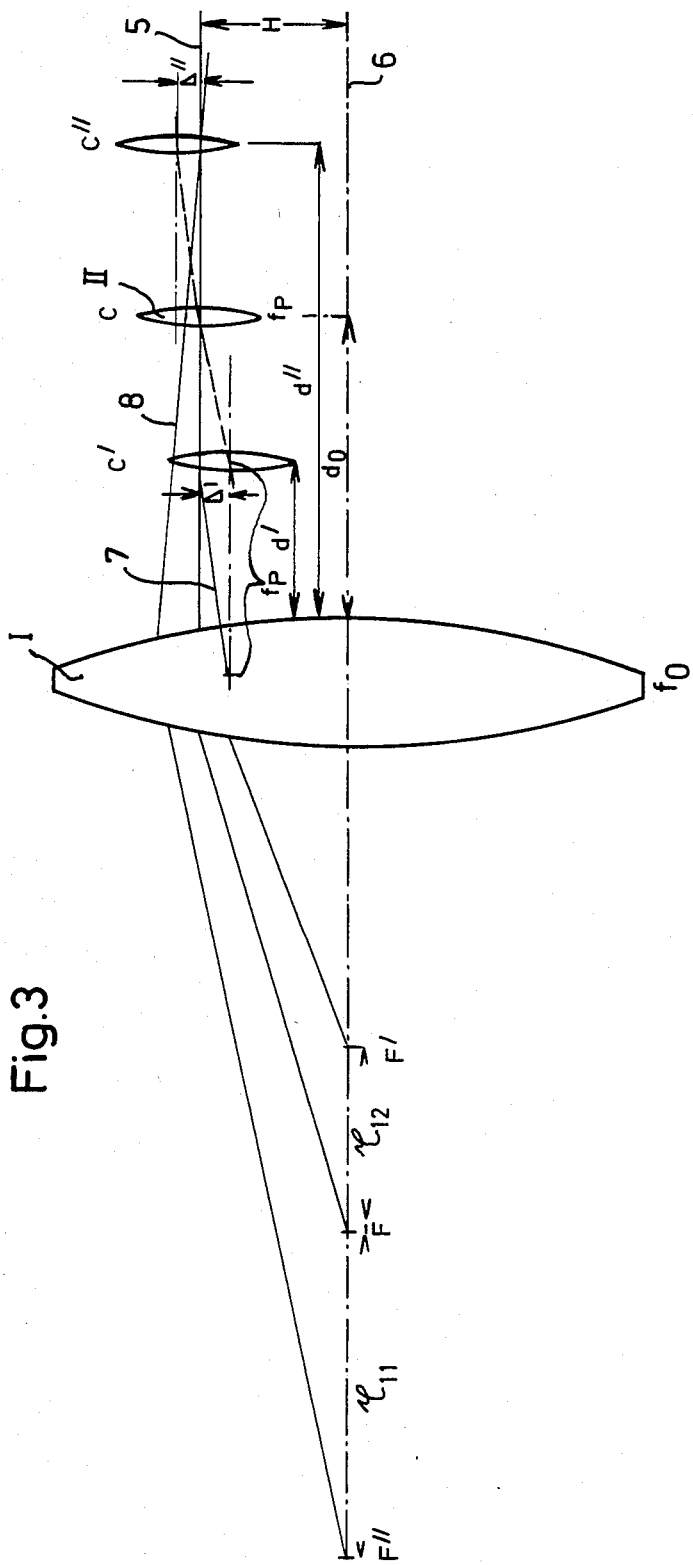
FIG. 3 shows diagrammatically the displacement of the first displaceable lens group of the optical system.

FIG. 3 shows how the lens group II must be displaced perpendicular to the optical axis when it is moved within range 2 shown in FIG. 1 in order to change the working distance $s_o$. In position C, in which lens group II has the distance $d_o$ from the main objective I the light beam originating from the focal point F of this objective proceeds through the center point of lens group II and proceeds behind this group along optical axis 5. This optical axis 5 corresponds to the optical axis of the following lens group III (not shown here). Optical axis 5 is shifted by the amount H from the optical axis passing through the center of the main objective I.

When moving lens group II axially it is necessary to displace it at the same time perpendicular to the optical axis 5 in such a way that the optical axis of the light behind lens group II in any case and independently from the axial position of this group coincides with optical axis 5.

When moving the focusing range by the Newtonian value $\zeta_{12}$ shown in FIG. 3 in the direction towards the main objective I, the light beam originating from point F' proceeds behind objective I in direction 7. This beam 7 impinges on lens group II, which is now in position c', having a distance d' from objective I and being displaced by the amount $\Delta'$ downward from axis 5. In this position of lens group II it effects that the beam 7 behind this group proceeds along optical axis 5. When moving the focusing range by the Newtonian value $\zeta_{11}$ shown in FIG. 3 in the direction away from main objective I, the light beam originating from point F'' proceeds behind objective I in direction 8. This beam 8 impinges on lens group II which is now moved in position c'', having a distance d'' from objective I and being displaced by the amount $\Delta''$ upwards from axis 5. In this position of lens group II it effects that the beam 8 behind this group proceeds along optical axis 5.

The amount $\Delta$ is calculated from the Newtonian formula $$|\Delta| = \frac{f_p \cdot H}{f_o - d - \frac{f_p^2}{\zeta}}$$

in which $f_p$ is the focal length of the lens group II,
$f_o$ is the focal length of the objective I,
H is the distance away of the optical axes 5 and 6,
d is the distance of the lens group II from the objective I, and
$\zeta$ is the Newtonian value ($\zeta_{11}$ and $\zeta_{12}$ of FIG. 3).

In the following numerical example the following numerical values for d and $\Delta$ are obtained for the $\zeta_{11}$ and $\zeta_{12}$ values which can be noted from the drawing, wherein is $f_o=225$, $f_p=50$ and $d_o=30$:

| | | |
|---|---|---|
| $\zeta_{11} = -175$ | $d = 34.72$ | $\Delta = 1.147$ |
| $\zeta_{12} = 75$ | $d = 24.10$ | $\Delta = -1.16$ |

In FIG. 1, the curves shown above the lens members IIIa, IIIb may represent schematically the effective operating edges of cams which move these members IIIa and IIIb.

What is claimed is:

1. An optical system of variable focal and back-focal length for operation microscopes, comprising an objective (I) of fixed focal length, combined with an optical system of variable focal length including a first lens group (II) and a second lens group (IIIa, IIIb), the objective projecting an image of an object, and the first lens group of the system being displaceable and imaging the image projected by the objective onto the focal point of the second lens group (IIIa, IIIb) of the system, the components of the second lens group (IIIa, IIIb) being displaceable on the optical axis and being coupled together for movement in order to change the focal length of the system.

2. An optical system of variable focal and back-focal length for operation microscopes, comprising an objective (I) of fixed focal length, combined with an optical system of variable focal length including a first lens group (II) and a second lens group (IIIa, IIIb), the objective projecting an image of an object, and the first lens group of the system being displaceable and imaging the image projected by the objective onto the focal point of the second lens group (IIIa, IIIb) of the system, said first lens group (II) being simultaneously displaceable both axially and in a direction perpendicular to an optical axis (5) defined by said second lens group (IIIa, IIIb).

3. An optical system of variable focal and back-focal length for operation microscopes, comprising an objective (I) of fixed focal length, combined with an optical system of variable focal length including a first lens group (II) and a second lens group (IIIa, IIIb), the objective projecting an image of an object, and the first lens group of the system being displaceable and imaging the image projected by the objective onto the focal point of the second lens group (IIIa, IIIb) of the system, the components of the second lens group (IIIa, IIIb) being displaceable on the optical axis and being coupled together for movement in order to change the focal length of the system, said first lens group (II) being simultaneously displaceable both axially and in a direction perpendicular to an optical axis (5) defined by said second lens group (IIIa, IIIb).

4. The invention defined in claim 1, further comprising cams for moving the components (IIIa, IIIb) of the second lens group.

5. The invention defined in claim 3, further comprising cams for moving the components (IIIa, IIIb) of the second lens group.

* * * * *